(12) United States Patent
Midgley

(10) Patent No.: US 7,453,052 B2
(45) Date of Patent: Nov. 18, 2008

(54) ELECTRICAL DISTRIBUTION APPARATUS WITH CONTROLLED COOLING

(75) Inventor: Stephen G. Midgley, Stafford Springs, CT (US)

(73) Assignee: General Electric Company, Schenectady, NY (US)

( * ) Notice: Subject to any disclaimer, the term of this patent is extended or adjusted under 35 U.S.C. 154(b) by 409 days.

(21) Appl. No.: 11/283,895

(22) Filed: Nov. 21, 2005

(65) Prior Publication Data
US 2007/0115630 A1    May 24, 2007

(51) Int. Cl.
H05B 3/68    (2006.01)
H05B 3/08    (2006.01)
H02H 5/04    (2006.01)

(52) U.S. Cl. .................. 219/448.19; 219/541; 361/103

(58) Field of Classification Search ............ 219/448.19, 219/538–541; 361/103–106, 641–652
See application file for complete search history.

(56) References Cited

U.S. PATENT DOCUMENTS

| | | | |
|---|---|---|---|
| 4,337,569 A | 7/1982 | Pierce | 29/605 |
| 6,157,282 A | 12/2000 | Hopkinson | 336/57 |
| 6,399,876 B1 | 6/2002 | Oakes | 174/15.1 |
| 6,556,404 B2 * | 4/2003 | Figueroa et al. | 361/93.1 |
| 6,876,304 B2 * | 4/2005 | Pedoeem et al. | 340/584 |
| 2005/0040924 A1 * | 2/2005 | LaBoube et al. | 336/5 |
| 2005/0225909 A1 * | 10/2005 | Yoshizaki et al. | 361/42 |

* cited by examiner

*Primary Examiner*—Sang Y Paik
(74) *Attorney, Agent, or Firm*—Cantor Colburn LLP

(57) ABSTRACT

An electrical distribution apparatus configured to connect a load to a power source is disclosed. The apparatus includes a housing having an air inlet and an air outlet, a distribution conduction path, a thermal sensor in thermal communication with the conduction path, an electrical disconnect, and an airflow generator. The electrical disconnect is connected in series with the conduction path and is configured to isolate the load from the power source on command, the disconnect being in signal communication with the thermal sensor. The airflow generator is in signal communication with the thermal sensor and is arranged to cause air to flow into the air inlet and out of the air outlet. The airflow generator is configured to turn on in response to the thermal sensor sensing a first temperature, and the disconnect is configured to disconnect the load from the power source in response to the thermal sensor sensing a second temperature greater than the first temperature.

19 Claims, 2 Drawing Sheets

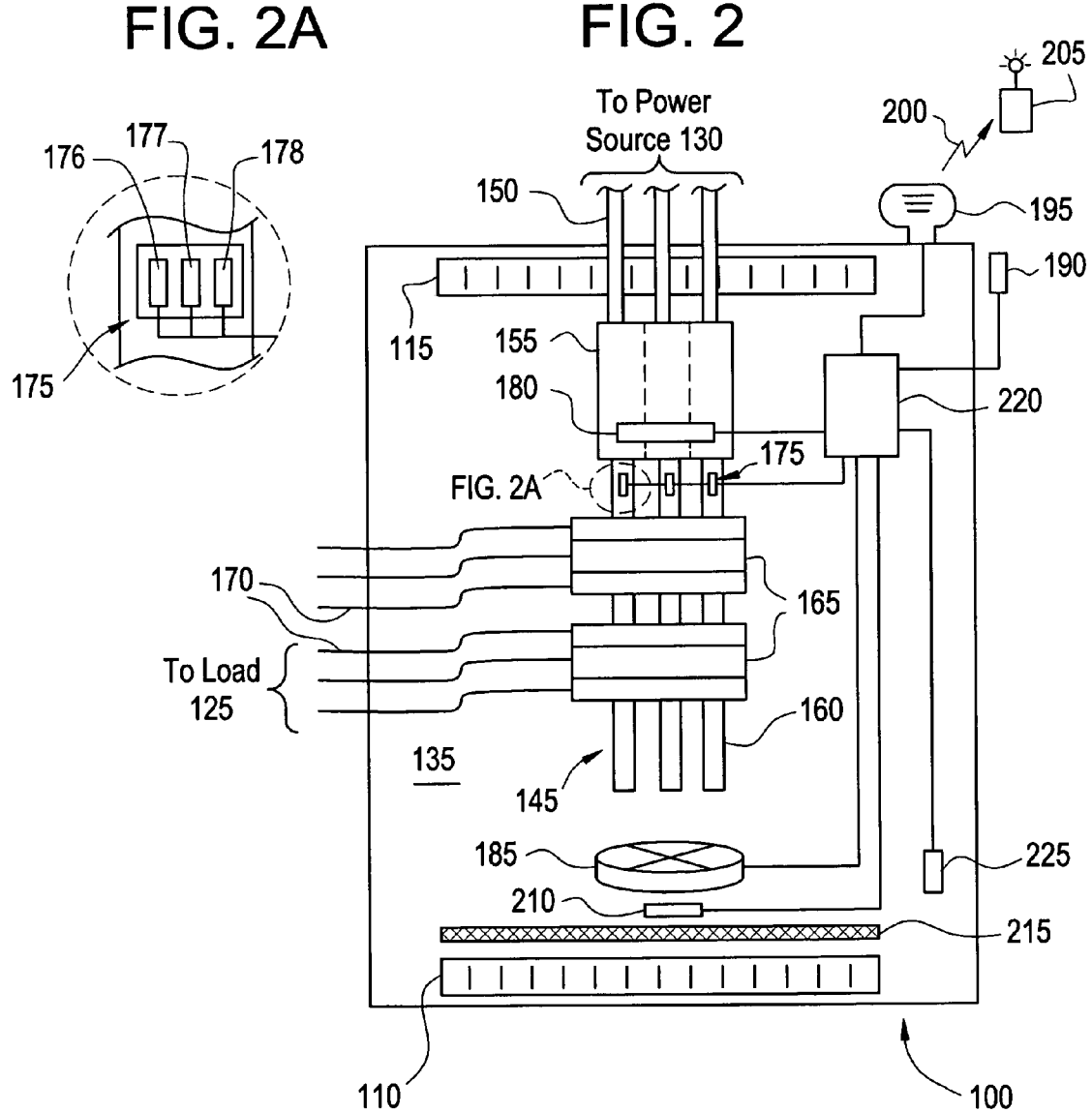

ELECTRICAL DISTRIBUTION APPARATUS WITH CONTROLLED COOLING

BACKGROUND OF THE INVENTION

The present disclosure relates generally to an electrical distribution apparatus, and particularly to an electrical distribution apparatus having controlled cooling.

Switchboards or other equipment for mounting and supplying electrical power to circuit breakers, switches, contactors, transformers, or other devices, are well known in the art. The electrical rating of the equipment limits the amount of total electrical current or number of devices that may be operated within the equipment due to the increased operating temperature associated with an increase in current demand. It is advantageous to control the thermal environment within the equipment enclosure to safely operate the components at acceptable operating temperatures. Thermal control means, such as vents, channels, and "chimneys", may be formed within the equipment housing to optimize the natural convective airflow within the equipment. Heat sinks and cooling fins may also be used to reduce the operating temperature of the equipment enclosure, busbars, or other components within the equipment enclosure. While existing thermal control means for electrical distribution equipment may be suitable for their intended purpose, there remains, however, a need in the art for an electrical distribution apparatus that provides an improved arrangement of control and protection against possible overtemperature conditions.

BRIEF DESCRIPTION OF THE INVENTION

An embodiment of the invention includes an electrical distribution apparatus configured to connect a load to a power source. The apparatus includes a housing having an air inlet and an air outlet, a distribution conduction path, a thermal sensor in thermal communication with the conduction path, an electrical disconnect, and an airflow generator. The electrical disconnect is connected in series with the conduction path and is configured to isolate the load from the power source on command, the disconnect being in signal communication with the thermal sensor. The airflow generator is in signal communication with the thermal sensor and is arranged to cause air to flow into the air inlet and out of the air outlet. The airflow generator is configured to turn on in response to the thermal sensor sensing a first temperature, and the disconnect is configured to disconnect the load from the power source in response to the thermal sensor sensing a second temperature greater than the first temperature.

Another embodiment of the invention includes an electrical distribution apparatus configured to connect a load to a power source. The apparatus includes a housing having an air inlet and an air outlet, a distribution conduction path, a thermal sensor in thermal communication with the conduction path, an ambient thermal sensor in thermal communication with ambient external to the housing, an airflow sensor disposed to sense an air flow arising from the airflow generator, the air flow being a function of applied voltage to the airflow generator as defined by a characteristic curve, an electrical disconnect connected in series with the conduction path and configured to isolate the load from the power source on command, the disconnect being in signal communication with the thermal sensor, an airflow generator in signal communication with the thermal sensor and arranged to cause air to flow into the air inlet and out of the air outlet, and an alarm. The airflow generator is configured to turn on in response to the thermal sensor sensing a first temperature. The disconnect is configured to disconnect the load from the power source in response to the thermal sensor sensing a second temperature greater than the first temperature. The alarm is configured to provide an alarm signal in response to a defined temperature difference between the thermal sensor and the ambient thermal sensor, and is configured to provide an alarm signal in response to the sensed airflow deviating from the characteristic curve by a defined amount.

BRIEF DESCRIPTION OF THE DRAWINGS

Referring to the exemplary drawings wherein like elements are numbered alike in the accompanying Figures:

FIG. 2 depicts a front view of the electrical distribution apparatus of FIG. 1 with the front panel removed to show internal parts;

FIG. 2A depicts and expanded view of a portion of the electrical distribution apparatus of FIG. 2.

DETAILED DESCRIPTION OF THE INVENTION

An embodiment of the invention provides an electrical distribution apparatus, such as a switchboard for example, with forced-air convective cooling, such as a blower or fan for example, and a thermal sensor that senses when the fan is not operating according to a desired specification. In response to an out-of-specification condition, either an alarm is sounded, or an electrical disconnect within the apparatus is tripped to automatically remove load power from the apparatus without the need for manual intervention. While an embodiment described herein may depict a switchboard as an exemplary electrical distribution apparatus, it will be appreciated that the disclosed invention is also applicable to other electrical distribution apparatus, such as a panelboard, or other equipment for mounting and supplying electrical power to a plurality of circuit breakers, switches, contactors, transformers, or other such electrical devices, for example.

Figure 1:
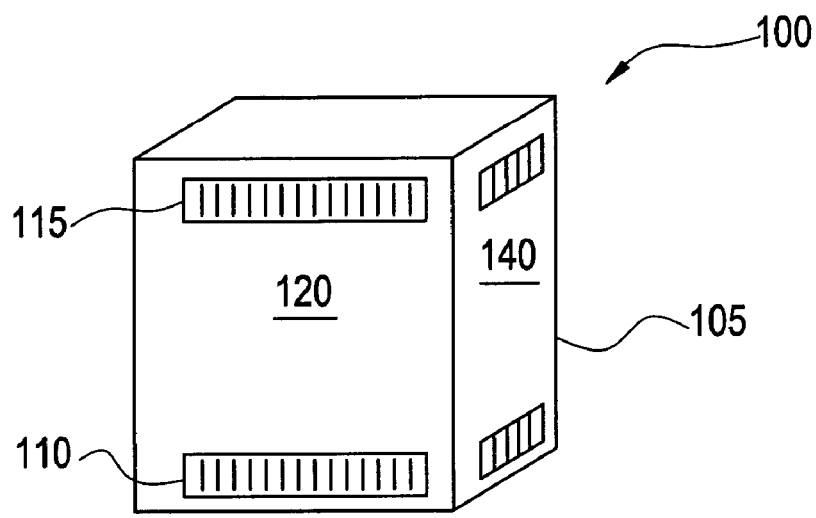
FIG. 1 depicts a top isometric view of an exemplary electrical distribution apparatus for use in accordance with an embodiment of the invention.
Figure 3:
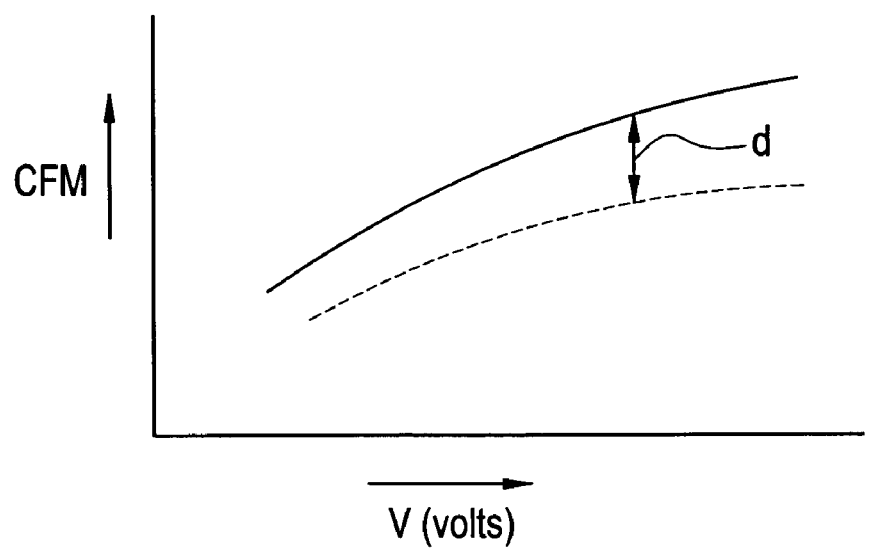
FIG. 3 illustrates a characteristic curve for use in accordance with an embodiment of the invention.

Referring to FIG. 1, an exemplary electrical distribution apparatus (hereinafter referred to as apparatus) 100 is depicted having a housing 105 with an air inlet vent 110 and an air outlet vent 115, which may be on one or more of the panels of housing 105. While the inlet and outlet vents may be used for natural convective cooling, an embodiment of the invention will be described herein that employs forced convective cooling and utilizes the inlet and outlet vents for the purpose thereof.

Referring now to FIG. 2, apparatus 100 is depicted with its front panel 120 removed and is configured to connect a load 125 to a power source 130. The air inlet vent 110 and air outlet vent 115 are depicted in solid line fashion as they may be located on the back panel 135 as well as the front panel 120, or just on one of the panels. Alternatively or in combination, vents 110 and 115 may be located on side panels 140, as illustrated in FIG. 1 and discussed above.

Within apparatus 100 is a distribution conduction path 145 that in an embodiment includes main power feeders 150, an electrical disconnect 155 (such as a circuit breaker having an electronic trip unit for example), a load bus 160 (which may be single phase or three phase for example), one or more branch feed disconnects 165 (such as branch circuit breakers for example), and load conductors 170. In an embodiment, apparatus 100 includes a plurality of branch circuit breakers 165 disposed in the conduction path 145 between the electrical disconnect 155 and the load 125. While FIG. 2 illustrates an apparatus 100 having certain electrical distribution components, it will be appreciated from the discussion above that not all of the components illustrated may be within apparatus 100, and apparatus 100 may include other electrical distribution components, all of which is contemplated and considered within the scope of the invention disclosed herein. Furthermore, while it will be recognized by one skilled in the art that FIG. 2 illustrates a three-phase electrical distribution apparatus, it will also be appreciated that embodiments of the invention are not limited to three-phase systems, and that the invention disclosed herein may also be applied to single-phase or three-phase with switching neutral systems.

In thermal communication with the conduction path 145 there are a set of thermal sensors 175, which are individually numbered 176, 177 and 178, and which are best seen by referring to FIG. 2A, which is an expanded view of a portion of one load bus 160 of FIG. 2. The set of thermal sensors 175 have at least one thermal sensor, and in an embodiment have three 176, 177, 178. While FIG. 2 illustrates thermal sensors 175 being in thermal communication with all three load buses 160, in an embodiment, thermal sensors 175 are disposed in thermal communication with only one phase (the center phase load bus 160 for example) of the conduction path 145 at the load side of disconnect 155. However, it will be appreciated that thermal sensors 175 may be disposed as appropriate for the purposes disclosed herein.

As illustrated, the electrical disconnect 155 is connected in series with the conduction path 145 and is configured to isolate the load 125 from the power source 130 on command, such as by a flux shifter and electrical trip unit 180 for example, which are devices and methods well known in the art. The electrical disconnect 155, via the electronic trip unit 180, is in signal communication with the set of thermal sensors 175, such as sensor 178, either directly or indirectly as will be discussed in more detail below.

An airflow generator 185 (also herein referred to as a fan) is disposed to cause air to flow into the inlet vent 110 and out of the outlet vent 115, is in signal communication with the set of thermal sensors 175, such as sensor 176, and is configured to turn on in response to thermal sensor 176 sensing a first temperature above a first threshold value. The electrical disconnect 155 is configured to disconnect the load 125 from the power source 130 in response to thermal sensor 178 sensing a second temperature above a second threshold value, which is greater than the first threshold value. For example, in an application, it may be desirable to limit the temperature at the conduction path 145 to a value below an insulation temperature rating of cable, such as 90 degree-Celsius (deg-C.) for example. In this situation, the fan 185 may be configured to turn on in response to thermal sensor 176 sensing a temperature above 60 deg-C., and the electrical disconnect 155 may be configured to trip in response to thermal sensor 178 sensing a temperature above 90 deg-C. It will be appreciated that the actual temperature at which an action is caused to occur may be application dependent, and may also be dependent on geographical location, such as arctic applications versus desert or tropical applications.

In an embodiment, an ambient thermal sensor 190 is positioned outside of housing 105 so that it is in thermal communication with the external ambient and in signal communication with the fan 185. In response to a first temperature difference between one of the sensors 175 and the ambient thermal sensor 190, the fan 185 is configured to turn on. For example, in an application, it may be desirable to turn the fan 185 on in response to the temperature of the conduction path 145 having a temperature that is above the ambient temperature by 40 deg-C.

In an embodiment, the ambient thermal sensor 190 is in signal communication with an alarm 195, which may be a fixed or flashing light, a sound alarm, a signal generator, or any combination thereof. In response to a second temperature difference between one of the sensors 175 and the ambient thermal sensor 190, the alarm 195 is configured to provide an alarm signal. For example, in an application, it may be desirable to activate the alarm 195 in response to the temperature of the conduction path 145 having a temperature that is above the ambient temperature by 50 deg-C. In an embodiment where the alarm 195 is a signal generator, the signal 200 may be transmitted via wireless communication to a remote receiver 205, such as a vibratory device for example, thereby providing a means for alerting remotely located maintenance personnel of a possible overtemperature condition at apparatus 100. Alternatively, the alarm 195 may be configured to provide an alarm signal in response to one of the sensors 175, such as sensor 177, exceeding a third threshold temperature that is between the first temperature sensed by sensor 176 for turning the fan 185 on and the second temperature sensed by sensor 178 for tripping the circuit breaker 155.

In an embodiment, ambient thermal sensor 190 is in signal communication with the electrical disconnect 155 via electronic trip unit 180. In response to a third temperature difference between one of the sensors 175, such as sensor 178, and the ambient thermal sensor 190, the electrical disconnect 155 is configured to disconnect the load 125 from the power source 130, thereby providing load circuit protection in the event of an overtemperature condition at apparatus 100. For example, in an application, it may be desirable to trip the circuit breaker 155 in response to the temperature of the conduction path 145 having a temperature that is above ambient temperature by substantially more than 50 deg-C.

In an embodiment, an airflow sensor 210 is disposed proximate the fan 185 in such a manner as to sense an air flow arising from the fan 185, which typically is a function of the applied voltage to the fan 185. FIG. 4 illustrates an exemplary functional relationship, herein referred to as a characteristic curve, for fan output, such as cubic-feet-per-minute (CFM), versus applied voltage (V). In an embodiment, the fan characteristic curve is non-linear. By utilizing information from the airflow sensor 210, the alarm 195 may be configured to provide an alarm signal in response to the sensed air flow deviating from the characteristic curve by a defined amount "d" (see FIG. 4), which may be for example the result of a locked or near-locked rotor condition in the fan motor, or the result of a clogged filter if the apparatus 100 includes an air filter 215. In an embodiment, the apparatus 100 includes an air filter 215 disposed near the air inlet vent 110 (see FIG. 2).

In an embodiment, thermal sensors 176, 178 and 177 (also herein referred to as first, second and third thermal sensors, respectively) are thermal switches, thereby providing direct means for actuating fan 185, electrical disconnect 155, and alarm 195, respectively. However, in an alternative embodiment, apparatus 100 includes a control device 220 that is in signal communication with the set of thermal sensors 175, which are not necessarily thermal switches, the ambient thermal sensor 190, and the airflow sensor 210, and is in control communication with the fan 185, the alarm 195, and the electrical disconnect 155. In FIG. 2, a line between control device 220 and a sensor represents a signal line, and a line between control device 220 and a controlled device represents a control line. In response to the first thermal sensor 176 sensing a first temperature, the control device 220 is configured to turn the fan 185 on, and in response to the second thermal sensor 178 sensing a second temperature greater than the first temperature, the control device 200 is configured to cause the electrical disconnect 155 to disconnect the load 125 from the power source 130. In a further embodiment, and in response to the third thermal sensor 177 sensing a third temperature, the control device 220 is configured to activate the alarm 195.

In an embodiment, the control device 220 is in signal communication with both thermal sensor 177 and ambient thermal sensor 190. In response to a defined temperature difference between the third thermal sensor 177 and the ambient thermal sensor 190 being reached or exceeded, the control device 200 is configured to activate the alarm 195.

In a similar fashion, the control device 220 may utilize information relating to the temperature difference between first thermal sensor 176 and ambient thermal sensor 190, or the temperature difference between second thermal sensor 178 and ambient thermal sensor 190, to either turn the fan 185 on, or trip the circuit breaker 155, respectively.

The above-mentioned examples describe control schemes that turn the fan 185 on, activate the alarm 195, or trip the circuit breaker 155, in response to an absolute temperature being reached or exceeded, or in response to a temperature differential with respect to ambient being reached or exceeded. In an alternative embodiment, the control device 220 may be configured to turn the fan 185 on, activate the alarm 195, or trip the circuit breaker 155, in response to a defined rate of rise of temperature being sensed by one of the sensors 175. For example, if the rate of rise of temperature of the conduction path 145, having known electrical characteristics, size, and maximum ampere rating, is above a first, a second, or a third expected value, then either the fan 185 may be turned on, the alarm 195 activated, or the circuit breaker 155 tripped, respectively, thereby providing an added level of protection to an overtemperature condition at apparatus 100.

While not directly related to an overtemperature condition at apparatus 100, further safeguards may be employed by including a moisture sensor 225 disposed proximate the bottom of the housing 105, which may be used for sensing an equipment flood condition. In response to the moisture sensor 225 sensing a moisture level greater than a defined first threshold, the alarm 195 may be configured to provide an alarm signal, and in response to the moisture sensor 225 sensing a moisture level greater than a defined second threshold, the electrical disconnect 155 may be configured to disconnect the load 125 from the power source 130. It is contemplated that more than one moisture sensor 225 may be employed to activate more than one controlled device.

While certain combinations of thermal sensors 176, 177, 178, ambient thermal sensor 190, airflow sensor 210, moisture sensor 225, fan 185, alarm 195, and electrical disconnect 155, have been described herein, it will be appreciated that these certain combinations are for illustration purposes only and that any combination of any of the sensors and controlled devices may be employed in accordance with an embodiment of the invention. Also, while certain types of sensors have been described herein, it will be appreciated that other sensors may be employed, such as part-per-million contaminant sensors or gas sensors for example, for sensing dust or low dielectric gases that may cause arcing. Any and all such combinations and devices are contemplated herein and are considered within the scope of the invention disclosed.

While an embodiment of the invention is illustrated herein having a control device 220, from the foregoing it will be appreciated that the control device 220 may not be necessary where some of the thermal sensors are thermal switches. Accordingly, the element labeled 220 in FIG. 2 may be considered in one embodiment to be a control device 220, and in another embodiment to be a junction or a communication bus.

While an embodiment of the invention has been described and illustrated with forced-air convective cooling that employs a blower or fan as an airflow generator, it is also contemplated that the airflow generator could be used as part of a refrigeration cooling system. Accordingly, the term airflow generator is intended to encompass both non-refrigeration and refrigeration cooling systems.

As disclosed, some embodiments of the invention may include some of the following advantages: improved protection of a distribution system by alarming maintenance personnel or interrupting power at an electrical distribution apparatus in the event of a stopped airflow generator or clogged air filter; and, use of integrated sensing and main breaker trip signaling provides for safe equipment operation without manual intervention in the event of an under-specification air flow.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best or only mode contemplated for carrying out this invention, but that the invention will include all embodiments falling within the scope of the appended claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. An electrical distribution apparatus configured to connect a load to a power source, the apparatus comprising:
   a housing having an air inlet and an air outlet;
   a distribution conduction path;
   at least one thermal sensor in thermal communication with the conduction path;
   an electrical disconnect connected in series with the conduction path and configured to isolate the load from the power source on command, the disconnect being in signal communication with the at least one thermal sensor;
   a plurality of branch disconnects disposed within the housing and connected in series with the electrical disconnect, and configured to isolate an associated circuit of the load from the power source on command;
   an airflow generator in signal communication with the at least one thermal sensor and arranged to cause air to flow into the air inlet and out of the air outlet; and
   a reference thermal sensor in thermal communication with a reference temperature external to the housing;
   wherein the airflow generator is configured to turn on in response to the at least one thermal sensor sensing a first temperature;

wherein the disconnect is configured to disconnect the load from the power source in response to the at least one thermal sensor sensing a second temperature greater than the first temperature;

wherein the airflow generator is configured to turn on in response to a first temperature difference between the at least one thermal sensor and the reference thermal sensor, and disposed to provide a forced airflow across the electrical disconnect and the plurality of branch disconnects.

2. The apparatus of claim 1, wherein:
the reference thermal sensor comprises an ambient thermal sensor in thermal communication with ambient external to the housing.

3. The apparatus of claim 1, wherein:
the reference thermal sensor comprises an ambient thermal sensor in thermal communication with ambient external to the housing; and
an alarm configured to provide an alarm signal in response to a second temperature difference between the at least one thermal sensor and the ambient thermal sensor.

4. The apparatus of claim 3, further comprising:
a moisture sensor disposed proximate the bottom of the housing;
wherein the alarm configured to provide an alarm signal in response to the moisture sensor sensing a moisture level greater than a defined first threshold, the disconnect is configured to disconnect the load from the power source in response to the moisture sensor sensing a moisture level greater than a defined second threshold, or both of the foregoing.

5. The apparatus of claim 3, wherein:
the alarm comprises a fixed or flashing light, a sound alarm, a signal generator in wireless communication with a remote receiver, or any combination comprising at least one of the foregoing.

6. The apparatus of claim 1, wherein:
the reference thermal sensor comprises an ambient thermal sensor in thermal communication with ambient external to the housing;
wherein the disconnect is configured to disconnect the load from the power source in response to a third temperature difference between the at least one thermal sensor and the ambient thermal sensor.

7. The apparatus of claim 1, wherein:
the airflow generator is configured to turn on in response to a first rate of rise of temperature sensed by the at least one thermal sensor.

8. The apparatus of claim 1, further comprising:
an alarm configured to provide an alarm signal in response to a second rate of rise of temperature sensed by the at least one thermal sensor.

9. The apparatus of claim 1, further comprising:
a control device in signal communication with the at least one thermal sensor;
wherein the control device is configured to turn the airflow generator on in response to the at least one thermal sensor sensing a first temperature, and to cause the electrical disconnect to disconnect the load from the power source in response to the at least one thermal sensor sensing a second temperature greater than the first temperature.

10. The apparatus of claim 1, wherein:
the at least one thermal sensor comprises a first thermal sensor and a second thermal sensor, each thermal sensor being in thermal communication with the conduction path;

the airflow generator is in signal communication with the first thermal sensor, and is configured to turn on in response to the first thermal sensor sensing a first temperature;
the disconnect is in signal communication with the second thermal sensor, and is configured to disconnect the load from the power source in response to the second thermal sensor sensing a second temperature greater than the first temperature.

11. The apparatus of claim 10, wherein:
the first and second thermal sensors are thermal switches.

12. An electrical distribution apparatus configured to connect a load to a power source, the apparatus comprising:
a housing having an air inlet and an air outlet;
a distribution conduction path;
at least one thermal sensor in thermal communication with the conduction path;
an electrical disconnect connected in series with the conduction oath and configured to isolate the load from the power source on command, the disconnect being in signal communication with the at least one thermal sensor;
an airflow generator in signal communication with the at least one thermal sensor and arranged to cause air to flow into the air inlet and out of the air outlet;
an airflow sensor disposed to sense an air flow arising from the airflow generator, the air flow being a function of applied voltage to the airflow generator, the functional relationship defining a characteristic curve; and
an alarm configured to provide an alarm signal in response to the sensed airflow deviating from the characteristic curve by a defined amount;
wherein the airflow generator is configured to turn on in response to the at least one thermal sensor sensing a first temperature; and
wherein the disconnect is configured to disconnect the load from the power source in response to the at least one thermal sensor sensing a second temperature greater than the first temperature.

13. The apparatus of claim 12, further comprising:
an air filter disposed proximate the air inlet.

14. An electrical distribution apparatus configured to connect a load to a power source, the apparatus comprising:
a housing having an air inlet and an air outlet;
a distribution conduction path;
at least one thermal sensor in thermal communication with the conduction path;
an electrical disconnect connected in series with the conduction path and configured to isolate the load from the power source on command, the disconnect being in signal communication with the at least one thermal sensor;
an airflow generator in signal communication with the at least one thermal sensor and arranged to cause air to flow into the air inlet and out of the air outlet;
an ambient thermal sensor in thermal communication with ambient external to the housing; and
an alarm configured to provide an alarm signal in response to a defined temperature difference between the at least one thermal sensor and the ambient thermal sensor;
wherein the at least one thermal sensor comprises a first thermal sensor and a second thermal sensor, each thermal sensor being in thermal communication with the conduction path;
wherein the airflow generator is in signal communication with the first thermal sensor, and is configured to turn on in response to the first thermal sensor sensing a first temperature;

wherein the disconnect is in signal communication with the second thermal sensor, and is configured to disconnect the load from the power source in response to the second thermal sensor sensing a second temperature greater than the first temperature.

15. The apparatus of claim 14, wherein:
the first and second thermal sensors are thermal switches;
the at least one thermal sensor further comprises a third thermal sensor; and
the alarm is configured to provide an alarm signal in response to a defined temperature difference between the third thermal sensor and the ambient thermal sensor.

16. The apparatus of claim 15, further comprising:
a control device in signal communication with the third thermal sensor and the ambient thermal sensor;
wherein the control device is configured to activate the alarm in response to the defined temperature difference between the third thermal sensor and the ambient thermal sensor being reached or exceeded.

17. The apparatus of claim 14, further comprising:
a plurality of circuit breakers disposed in the housing in the conduction path between the electrical disconnect and the load.

18. An electrical distribution apparatus configured to connect a load to a power source, the apparatus comprising:
a housing having an air inlet and an air outlet;
a distribution conduction path;
at least one thermal sensor in thermal communication with the conduction path;
an ambient thermal sensor in thermal communication with ambient external to the housing;
an airflow sensor disposed to sense an airflow arising from the airflow generator, the airflow being a function of applied voltage to the airflow generator, the functional relationship defining a characteristic curve;
an electrical disconnect connected in series with the conduction path and configured to isolate the load from the power source on command, the disconnect being in signal communication with the at least one thermal sensor;
a plurality of branch disconnects disclosed within the housing and connected in series wit the electrical disconnect, and configured to isolate an associated circuit of the load from the power source on command;
an airflow generator in signal communication with the at least one thermal sensor and arranged to cause air to flow into the air inlet and out of the air outlet; and
an alarm;
wherein the airflow generator is configured to turn on in response to the at least one thermal sensor sensing a first temperature, and disposed to provide a forced airflow across the electrical disconnect and the plurality of branch disconnects;
wherein the disconnect is configured to disconnect the load from the power source in response to the at least one thermal sensor sensing a second temperature greater than the first temperature; and
wherein the alarm is configured to provide an alarm signal in response to a defined temperature difference between the at least one thermal sensor and the ambient thermal sensor, and is configured to provide an alarm signal in response to the sensed air flow deviating from the characteristic curve by a defined amount.

19. The apparatus of claim 18, further comprising:
an air filter disposed proximate the air inlet.

* * * * *